United States Patent Office 3,803,309
Patented Apr. 9, 1974

3,803,309
GROWTH HORMONE RELEASE STIMULATING PHARMACEUTICAL PREPARATIONS OF N-ACETYL-10-17 AMINOACID ACTH-SEQUENCE PEPTIDES
Pierre Antoine Desaulles, Muttenz, and Gaston Zahnd, Geneve, Switzerland, assignors to Ciba-Geigy Corporation, Ardsley, N.Y.
No Drawing. Filed Nov. 30, 1971, Ser. No. 203,481
Claims priority, application Switzerland, Dec. 2, 1970, 17,877/70
Int. Cl. A61k 17/16
U.S. Cl. 424—179       3 Claims

ABSTRACT OF THE DISCLOSURE

Pharmaceutical preparations for stimulating the release of growth hormone, especially for metabolic and endocrinological diagnosis which contain peptides having 10-17 aminoacids of the ACTH-sequence or certain analogues thereof, or amides or N-acyl-derivatives thereof.

---

The invention relates to pharmaceutical preparations which effect a regulation of the release of the growth hormone. These preparations contain as active constituent a peptide of the Formula I

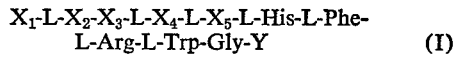

wherein $X_1$ represents serine (L, LD or D), alanine (L, LD or D), proline (L, LD or D), threonine (L, LD or D), phenylglycine (L, LD or D), glycine, β-alanine, propionic acid or β-hydroxy-propionic acid, $X_2$ represents tyrosine or phenylalanine, $X_3$ represents glycine, L-serine or L-alanine, $X_4$ represents methionine or α-lower alkyl-α-aminoacetic acid, in which lower alkyl has 2–4 carbon atoms, $X_5$ represents glutamyl or glutaminyl and Y represents one or more of the amino acids 11–17 of β-corticotropin, in which one or more of the amino acids in the 11 and 15–17 positions may be substituted by L-ornithine or the aminoacid in 17-position by L-lysine, or contain C-terminal amides of these peptides, N-acyl derivatives of these peptides or peptide amides, or acid addition salts or complexes of these compounds. The α-lower alkyl-α-aminoacetic acid is, for example, α-aminobutyric acid, valine, norvaline, leucine, isoleucine or, above all, norleucine. Acyl groups for the acylation of the amino groups, above all the $N^\alpha$-amino group, are the radicals of carboxylic acids such as aliphatic, aromatic, araliphatic, heterocyclic or heterocyclyl-aliphatic carboxylic acids, especially the radicals of lower monobasic or dibase alkane-acids or alkene-acids such as formic acid, acetic acid, propionic acid, butyric acids, acrylic acid or succinic acid, of alicyclic carboxylic acids, such as cycloalkyl carboxylic acids, of monobasic or dibasic monocyclic aromatic carboxylic acids such as unsubstituted or substituted benzoic acid or phthalic acid, of unsubstituted or aryl-substituted aryl-lower alkyl-carboxylic acids or aryl lower alkenyl-carboxylic acids such as phenylacetic acid, of unsubstituted or substituted monobasic or dibasic 5-membered to 6-membered heterocyclic acids with nitrogen, sulphur and/or oxygen as hetero-atoms, such as pyridinecarboxylic acids, or thiophenecarboxylic acids, or of heterocyclyl-lower alkene-acids such as pyridylacetic acid or imidazolylacetic acid, wherein the substituents of the rings are for example halogen atoms, nitro groups, lower alkyl or lower alkoxy groups or lower carbalkoxy groups. Further acyl radicals to be mentioned are above all acyl radicals of sulphonic acids such as lower alkane-sulphonic acids, for example methane- or ethanesulphonic acid or arylsulphonic acids, for example benzene- or toluenesulphonic acid, and also acyl radicals which are derived from carbonic acid or thiocarbonic acid or their esters or amides, for example lower alkyloxycarbonyl groups such as ethoxycarbonyl or tert.-butoxycarbonyl, and also benzyloxycarbonyl which is unsubstituted or substituted as indicated above, carbamoyl and thiocarbamoyl, for example N-lower alkylcarbamoyl, N-phenylcarbamoyl and N-phenyl-thiocarbamoyl. Principally the $N^\alpha$-acyl radical is the acetyl radical.

As acid addition salts, salts of therapeutically usable acids such as hydrochloric acid, acetic acid, sulphuric acid, phosphoric acid and sulphonic acids, such as lower alkanesulphonic acids, benzenesulphonic acid or toluenesulphonic acid, should especially be mentioned.

By complexes there are to be understood the compounds of as yet unclarified structure, which are produced on adding certain inorganic or organic substances to long-chain peptides and which impart a prolonged action to the latter. Such substances can for example be described for insulin and for ACTH and other adrenocorticotropically active peptides. Compounds to be mentioned are, for example, inorganic compounds such as are derived from metals such as calcium, magnesium, aluminium, cobalt and especially zinc, above all sparingly soluble salts such as phosphates, pyrophosphates and polyphosphates, as well as hydroxides of these metals, optionally in combination with acid organic substances, for example polysaccharides which contain acid groups, such as carboxymethylcellulose, or tannic acid, polyglutamic acid or partially hydrolyzed gelatin, and also alkali metal polyphosphates such as for example "Calgon N," "Calgon 322," "Calgon 188" or "Polyron B 12." Organic substances which cause a prolongation of the action are for example nonantigenic gelatines, for example polyoxygelatine, polyvinylpyrrolidone and carboxymethylcellulose, and also sulphonic acid esters or phosphoric acid esters of alginic acid, dextran, polyphenols and polyalcohols, above all polyhoretin—phosphate and phytic acid, as well as polymers and copolymers of aminoacids, for example polyglutamic acid.

Particularly to be highlighted are peptides and peptide-amides of the Formula I, wherein Y represents 3–6 of the aminoacids 11–16 of β-corticotropin, and their C-terminal amides, in particular peptide amides with 13 aminoacids.

Particularly active preparations are those that contain the peptides and peptide amides according to Formula I, which contain a D-aminoacid as first N-terminal aminoacid, principally peptides and peptide amides with D-serine as first aminoacid, and $N^\alpha$-acetyl derivatives of these peptides. As aminoacid in the 2-position the peptides or peptide amides contain preferably tyrosine, and as aminoacids in the 3-position they contain chiefly L-serine or glycine. The 5th aminoacid is preferably methionine or norleucine, the 11th and/or 15th–17th are preferably lysine. As examples of the peptides or peptide amides contained in the new preparations there may be cited:

β¹⁻¹³-corticotropin and its Val¹³-amide,
$N^\alpha$-acetyl-β¹⁻¹³-corticotropin and its Val¹³-amide,
D-Ser¹-β¹⁻¹³-corticotropin and its Val¹³-amide,
$N^\alpha$-acetyl-D-Ser¹-β¹⁻¹³-corticotropin and its Val¹³-amide,
D-Ser¹-Nle⁴-β¹⁻¹³-corticotropin and its Val¹³-amide,
$N^\alpha$-acetyl-D-Ser¹-Nle⁴-β¹⁻¹³-corticotropin and its Val¹³-amide,
D-Ser¹-Gln⁵-β¹⁻¹³-corticotropin and its Val¹³-amide,
$N^\alpha$-acetyl-D-Ser¹-Gln⁵-β¹⁻¹³-corticotropin and its Val¹³-amide,
D-Ser¹-Gly³-β¹⁻¹³-corticotropin and its Val¹³-amide,
$N^\alpha$-acetyl-D-Ser¹-Gly³-β¹⁻¹³-corticotropin and is Val¹³-amide, D-Ser$^1$-Gly$^3$-Nle$^4$-$\beta^{1-13}$-corticotropin and its Val$^{13}$-amide,
N$^\alpha$-acetyl-D-Ser$^1$-Gly$^3$-Nle$^4$-$\beta^{1-13}$-corticotropin and its Val$^{13}$-amide,
$\beta^{1-14}$-corticotropin and its Gly$^{14}$-amide,
N$^\alpha$-acetyl-$\beta^{1-14}$-corticotropin and its Gly$^{14}$-amide,
D-Ser$^1$-$\beta^{1-14}$-corticotropin and its Gly$^{14}$-amide,
N$^\alpha$-acetyl-D-Ser$^1$-$\beta^{1-14}$-corticotropin and its Gly$^{14}$-amide,
D-Ser$^1$-Nle$^4$-$\beta^{1-14}$-corticotropin and its Gly$^{14}$-amide,
N$^\alpha$-acetyl-D-Ser$^1$-Nle$^5$-$\beta$-1$^{-14}$-corticotropin and its Gly$^{14}$-amide,
D-Ser$^1$-Gln$^5$-$\beta^{1-14}$-corticotropin and its Gly$^{14}$-amide,
N$^\alpha$-acetyl-D-Ser$^1$-Gln$^3$-$\beta^{1-14}$-corticotropin and its Gly$^{14}$-amide,
D-Ser$^1$-Gly$^3$-$\beta^{1-14}$-corticotropin and its Gly$^{14}$-amide,
N$^\alpha$-acetyl-D-Ser$^1$-Gly$^5$-$\beta^{1-14}$-corticotropin and its Gly$^{14}$-amide,
D-Ser$^1$-Gly$^3$-Nle$^4$-$\beta^{1-14}$-corticotropin and its Gly$^{14}$-amide,
N$^\alpha$-acetyl-D-Ser$^1$-Gly$^3$-Nle$^4$-$\beta^{1-14}$-corticotropin and its Gly$^{14}$-amide,
$\beta^{1-15}$-corticotropin and its Lys$^{15}$-amide,
N$^\alpha$-acetyl-$\beta^{1-15}$-corticotropin and its Lys$^{15}$-amide,
D-Ser$^1$-$\beta^{1-15}$-corticotropin and its Lys$^{15}$-amide,
N$^\alpha$-acetyl-D-Ser$^1$-$\beta^{1-15}$-corticotropin and its Lys$^{15}$-amide,
D-Ser$^1$-Nle$^4$-$\beta^{1-15}$-corticotropin and its Lys$^{15}$-amide,
N$^\alpha$-acetyl-D-Ser$^1$-Nle$^4$-$\beta^{1-15}$-corticotropin and its Lys$^{15}$-amide,
D-Ser$^1$-Gln$^5$-$\beta^{1-15}$-corticotropin and its Lys$^{15}$-amide,
N$^\alpha$-acetyl-D-Ser$^1$-Gln$^5$-$\beta^{1-15}$-corticotropin and its Lys$^{15}$-amide,
D-Ser$^1$-Gly$^3$-$\beta^{1-15}$-corticotropin and its Lys$^{15}$-amide,
N$^\alpha$-acetyl-D-Ser$^1$-Gly$^3$-$\beta^{1-15}$-corticotropin and its Lys$^{15}$-amide,
D-Ser$^1$-Gly$^3$-Nle$^4$-$\beta^{1-15}$-corticotropin and its Lys$^{15}$-amide,
N$^\alpha$-acetyl-D-Ser$^1$-Gly$^3$-Nle$^4$-$\beta^{1-15}$-corticotropin and its Lys$^{15}$-amide,
$\beta^{1-16}$-corticotropin and its Lys$^{16}$-amide,
N$^\alpha$-acetyl-$\beta^{1-16}$-corticotropin and its Lys$^{16}$-amide,
Gly$^1$-$\beta^{1-16}$-corticotropin and its Lys$^{16}$-amide,
N$^\alpha$-acetyl-Gly$^1$-$\beta^{1-16}$-corticotropin and its Lys$^{16}$-amide,
Gly$^1$-Nle$^4$-$\beta^{1-16}$-corticotropin and its Lys$^{16}$-amide,
N$^\alpha$-acetyl-Gly$^1$-Nle$^4$-$\beta^{1-16}$-corticotropin and its Lys$^{16}$-amide,
Gln$^5$-$\beta^{1-16}$-corticotropin and its Lys$^{16}$-amide,
N$^\alpha$-acetyl-Gln$^5$-$\beta^{1-16}$-corticotropin and its Lys$^{16}$-amide,
Gly$^{1,3}$-$\beta^{1-16}$-corticotropin and its Lys$^{16}$-amide,
N$^\alpha$-acetyl-Gly$^{1,3}$-$\beta^{1-16}$-corticotropin and its Lys$^{16}$-amide,
Nle$^4$-$\beta^{1-16}$-corticotropin and its Lys$^{16}$-amide,
N$^\alpha$-acetyl-Gly$^3$-Nle$^4$-$\beta^{1-16}$-corticotropin and its Lys$^{16}$-amide,
Lys$^{17}$-$\beta^{1-17}$-corticotropin and its Lys$^{17}$-amide,
N$^\alpha$-acetyl-Lys$^{17}$-$\beta^{1-17}$-corticotropin and its Lys$^{17}$-amide.

The preparations according to the invention contain the peptide active substance in an amount of 0.1 to 2 mg. per dosage unit. A dosage unit may be administered, for example, from 1 to 14 times weekly. Preferably a daily dose of 1 mg. of active substance is given.

The preparations contain the active substance in a suitable pharmaceutical, organic or inorganic carrier. Such carriers are substances which do not react with the peptides, primarily water, aqueous buffer solutions, mannitol, also sugars such as lactose, saccharose, glucose, starch, polyalkylene glycols, benzyl alcohol, sodium chloride, magnesium stearate, fatty acid esters, for example vegetable oils such as arachis oil, sesame oil, cotton seed oil, triesters of glycerin with fatty acids containing 8–12 carbon atoms, such as the registered trademarks Miglyol® for Labrafac®, described in Belgian Pat. No. 717,820, for example Miglyol 812, Labrafac WL 1349, diesters of polyethylene glycol with fatty acids containing 8–22 carbon atoms or mixtures of such esters with triglycerids, for example Labrafac® WL 1219, Labrafil® M 2735, sorbitan polyethylene glycol fatty acid esters, for example Tween® 80, sorbitan fatty acid esters, for example Arlacel®, esters of lower alkanols with long-chain fatty acids, for example ethyloleate, isopropylmyristate, isopropylpalmitate or Cetiol® V, and also long-chain hydrocarbons, for example Cosbiol® (perhydrosqualene) or mixtures of these substances. The pharmaceutical preparations may be for example in the form of lyophilisates or in the liquid form of solutions, suspensions or emulsions. If desired they may be sterilized and/or contain adjuvants such as preservatives, stabilizers, wetting or emulsifying agents. They may also contain further therapeutically useful substances.

The preparations are administered above all parenterally; but they can also be applied in resorbable form through the nasal or oral mucosa (nasal or buccal administration), as is described, for example, for ACTH peptides in Belgian Pat. 717,820. The parenteral application is effected, for example intravenously, in particular with buffer solutions such as sodium acetate solution in a pH range from 3.5 to 5.5, preferably from 4.0 to 4.5, or with lyophilisates, above all mannitol lyophilisates, to be dissolved in an aqueous, e.g. physiological aqueous saline solution, before use. A preferred form of application is also the subcutaneous application of aqueous solutions or suspensions of complexes with prolonged action, such as are described hereinabove, for example of complexes with zinc phosphate and/or zinc hydroxide, zinc polyphosphate, alkali polyphosphates such as Calgon®, carboxymethylcellulose, polyoxygelatin, polyphloretin phosphate, polyglutamic acid.

As already mentioned, the preparations have a regulating action on the release of the growth hormone. They can therefore be used for regulating growth in growth disturbances. They are particularly useful as diagnostic agents in metabolic and endocrinological diagnosis, wherein in comparison with the diagnostic agents conventionally used hitherto, such as arginine (used by infusion for the liberation of insuline) or insuline (to produce hypoglycemia which stimulates the release of the growth hormone), they are distinguished in particular by their specific mode of action, i.e. the release of the growth hormone, and by the virtual absence of additional side effects. Of the cited peptides or peptide derivatives, which optionally may be in the form of acid addition salts or complexes, the preparations according to the invention contain per dosage unit 0.1 to 2 mg. of the peptide or peptide derivative.

The invention therefore relates also to the use of the cited preparations for stimulating the release of the growth hormone.

The pharmaceutical preparations are prepared in known manner by mixing the active substance with the carrier. The peptides, peptide amides or derivatives contained in the pharmaceutical preparations, or their acid addition salts or complexes, are known or can be prepared by methods known in the art for the synthesis of peptides, chiefly by methods for synthesizing ACTH peptides, for example according to the process described in French Pat. 1,512,342. To manufacture the peptides or peptide amides or their derivatives the aminoacids are linked together in the desired sequence either singly or as preformed small peptide units. The linking of the aminoacid and/or peptide units is carried out as follows: An amino-acid or a peptide containing a protected α-amino group and an activated terminal carboxyl group is reacted with an aminoacid or a peptide containing a free α-amino group and a free or protected (for example esterified or amidated) terminal carboxyl group; or an aminoacid or a peptide containing an activated α-amino group and a protected terminal carboxyl group is reacted with an aminoacid or a peptide containing a free terminal carboxyl group and a protected α-amino group. The carboxyl group can be activated, for example, by conversion into an acid azide, anhydride, imidazolide or isoxazolide, or into an activated ester such as cyanomethyl ester, carboxymethyl ester, para-nitrophenyl ester, 2,4,5-trichlorophenyl ester, pentachlorophenyl ester, N-hydroxysuccinimide ester, N-hydroxyphthalimide ester, 8 - hydroxyquinoline ester, N- hydroxypiperidine ester, or by reaction with a carbodimide (if desired with addition of N-hydroxysuccinimide or unsubstituted or for instance halogen-, methyl- or methoxy-substituted 1-hydroxy-benzotriazole) or N,N'-carbonyldiimidazole. The amino group can be activated, for example, with a phosphite amide. The most frequently used methods are the carbodiimide method, the azide method, the method of the activated esters, the anhydride method and the Merrified method and the method of the N-carboxyanhydrides or N-thiocarboxyanhydrides.

Any free functional groups not participating in the reaction are advantageously protected, especially by protective groups which can be easily removed by hydrolysis or reduction. Protective groups are used above all which can be removed by strong inorganic or organic acids, for example hydrohalic acids such as hydrochloric acid, hydrofluoric acid or trifluoroacetic acid. As amino protective groups there may be mentioned, for example, unsubstituted or substituted aralkyl groups such as diphenylmethyl or triphenylmethyl groups, or acyl groups such as formyl, trifluoroacetyl, phthaloyl, para-toluenesulfonyl, benzylsulfonyl, benzenesulfenyl, ortho-nitrophenylsulfenyl, or especially groups derived from carbonic or thiocarbonic acid, such as carbobenzoxy groups whose aromatic radical may be substtiuted by halogen atoms or by nitro, lower alkyl, lower alkoxy or lower carbalkoxy groups, for example carbobenzoxy, para-bromo- or para-chloro-carbobenzoxy, para-nitrocarbobenzoxy, para-methoxy-carbobenzoxy, colored benzyloxycarbonyl groups such as para-phenylazo-benzyloxycarbonyl and para-(para'-methoxy-phenyl-azo) - benzyloxycarbonyl, tolyloxycarbonyl, 2-phenyl-isopropoxycarbonyl, 2 - tolyl-isopropoxycarbonyl and above all 2-(p-biphenylyl)-2-propyloxycarbonyl, also aliphatic oxycarbonyl groups, for example allyloxycarbonyl, cyclopentyloxycarbonyl, tertiary amyloxycarbonyl, adamantyloxycarbonyl, 2,2,2 - trichloroethyloxycarbonyl, 2 - iodoethoxycarbonyl and in the first place tertiary butoxycarbonyl.

The carboxyl groups are protected, for example, by amide or hydrazide formation or by esterification. For the esterification there may be used, for example, lower unsubstituted or substituted alkanols such as methanol, ethanol, cyanomethyl alcohol or especially tertiary butanol; also aralkanols such as aryl-lower alkanols, for example unsubstituted or substituted benzyl alcohols such as para-nitrobenzyl alcohol or para-methoxybenzyl alcohol, phenols and thiophenols such as para-nitrothiophenol, 2,4,5 - trichlorophenol, para-cyanophenol or para-methanesulfonylphenol; furthermore, for example, N-hydroxysuccinimide and N-hydroxyphthalimide, N-hydroxy-piperidine, 8-hydroxyquinoline.

The hydroxyl groups of the side chains, for example of the serine and/or tyrosine radicals, can be protected by etherification, for example with benzyl alcohol or preferably with tertiary butanol, but it is not absolutely necessary to protect them. For protecting the amino group in the guanidino grouping of arginine the nitro group and the tosyl group are specially preferred, though it is not necessary to protect the guanidino group. Nor is it absolutely necessary for the imino group of histidine to be protected, though it may be advantageous to protect it, for example by benzyl, trityl, adamantyloxycarbonyl or by the 2,2,2-trifluoro-1-tertiary butoxycarbonyl-aminoethyl or -1-benzyloxycarbonyl-aminoethyl groups. The protective groups are eliminated in the known manner by hydrogenolysis or hydrolysis, especially by acid hydrolysis, in a single step or, if desired, in several steps.

A preferred starting peptide is one in which the amino groups of the side chains are protected by the tertiary butoxycarbonyl group and the carboxyl groups of the side chains of the C-terminal acid—provided they are not amidated—are protected by the tertiary butylester group. These protective groups are advantageously eliminated by means of trifluoro-acetic acid, hydrocholric acid or hydrofluoric acid.

In the Merryfield synthesis the removal of these protective groups can also be accompanied simultaneously by the removal of the peptide from the resin.

For the manufacture of N-acyl derivatives the desired acyl group, for example the $N^\alpha$-acetyl group, can be introduced already during the synthesis. A special amino protective group is in this case not necessary. If desired, the amino groups can also be protected during the synthesis by conventional protective groups, these latter removed from the completed peptide sequence and the resulting peptide with free amino groups, N-acylated in the desired manner, for example by reaction with a mixed anhydride or acid azide containing the acyl radical in question or above all with an activated ester, such as phenyl ester or substituted phenyl ester.

Complexes with inorganic substances, such as difficultly soluble metal compounds, for example aluminium or zinc compounds, are manufactured in analogous manner as known for ACTH, for example by reaction with a soluble salt of the particular metal, for example zinc chloride or zinc sulphate, and precipitation with an alkali metal phosphate and/or hydroxide. Complexes with organic compounds such as polyoxygelatin, carboxymethylcellulose, polyvinyl pyrrolidone, polyphloretin phosphate, polyglutamic acid etc. are obtained by mixing these substances with the peptide in aqueous solution. In like manner it is also possible to manufacture insoluble compounds with alkali metal polyphosphates.

Depending on the reaction conditions employed the compounds are obtained in the form of bases or of their salts. From the salts the bases can be prepared in the known manner. When the bases are reacted with acids capable of forming therapeutically acceptable salts, they furnish salts, for example salts with inorganic acids, such as hydrohalic acids, for example hydrochloric or hydrobromic acid, perchloric, nitric, thiocyanic, sulfuric or phosphoric acid, or with organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, pamoic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulphanilic acid.

The following examples illustrate the invention.

EXAMPLE 1

A suspension is prepared from the following constituents:

| | Mg. |
|---|---|
| $N^\alpha$-acetyl-$\beta^{1-13}$ corticotropin-Val$^{13}$-amide | 1.00 |
| ZnCl$_2$ | 5.25 |
| Na$_2$HPO$_4$·2H$_2$O | 1.05 |
| NaCl | 2.0 |
| Benzyl alcohol | 10.0 |
| NaOH ad pH 8.3 | |
| Dist. water ad | 1.0 |

EXAMPLE 2

A suspension is prepared from the following constituents:

| | Mg. |
|---|---|
| $N^\alpha$-acetyl-$\beta^{1-13}$-corticotropin-Val$^{13}$-amide | 1.0 |
| ZnCl$_2$ | 6.30 |
| Na$_2$HPO$_4$·2H$_2$O | 1.26 |
| NaCl | 1.5 |
| Benzyl alcohol | 10.0 |
| NaOH ad pH 8.3 | |
| Dist. water ad | 1.0 |

EXAMPLE 3

A suspension is prepared from the following constituents:

| | Mg. |
|---|---|
| $N^\alpha$-acetyl-$\beta^{1-13}$-corticotropin-Val$^{13}$-amide | 0.5 |
| $ZnCl_2$ | 2.1 |
| Na-polyphosphate (average chain length=26) | 0.5 |
| NaCl | 7.13 |
| Benzyl alcohol | 10.0 |
| 0.5-n. NaOH ad pH 8.5 | |
| Dist. water ad, 1 ml. | |

EXAMPLE 4

A suspension is prepared from the following constituents:

| | Mg. |
|---|---|
| $N^\alpha$-acetyl-$\beta^{1-13}$ corticotropin-Val$^{13}$-amide | 1.00 |
| $ZnCl_2$ | 5.25 |
| Polyphosphate as in Example 3 | 2.00 |
| NaCl | 2.00 |
| Benzyl alcohol | 10.00 |
| 0.5-n. NaOH ad pH 8.5 | |
| Dist. water ad, 1 ml. | |

EXAMPLE 5

A suspension is prepared from the following constituents:

| | Mg. |
|---|---|
| $N^\alpha$-acetyl-D-Ser$^1$-$\beta^{1-13}$-corticotropin-Val$^{13}$-amide | 0.1 |
| $ZnCl_2$ | 3.7 |
| $Na_2HPO_4 \cdot 2H_2O$ | 0.735 |
| NaCl | 2.0 |
| Benzyl alcohol | 10.0 |
| 0.6-n. NaOH ad pH 8.8 | |
| Dist. water ad, 1.0 ml. | |

EXAMPLE 6

A suspension is prepared from the following constituents:

| | Mg. |
|---|---|
| $N^\alpha$-acetyl-D-Ser$^1$-$\beta^{1-13}$-corticotropin-Val$^{13}$-amide | 0.1 |
| $ZnCl_2$ | 5.25 |
| Mannitol | 25.0 |
| Calgon® 322 | 2.0 |
| NaCl | 1.0 |
| Benzyl alcohol | 10.0 |
| 0.5-n. NaOH ad pH 8.2 | |
| Dist. water ad, 1 ml. | |

EXAMPLE 7

A suspension is prepared from the following constituents:

| | Mg. |
|---|---|
| D-Ser$^1$-$\beta^{1-13}$-corticotropin-Val$^{13}$-amide | 0.1 |
| $ZnCl_2$ | 1.05 |
| $Na_2HPO_4 \cdot 2H_2O$ | 0.21 |
| NaCl | 2.0 |
| Benzyl alcohol | 10.0 |
| 0.6-n. NaOH ad pH 8.6 | |
| Dist. water ad, 1 ml. | |

The tridecapeptide amide used as starting material is described by W. Rittel in Pharmacology of Hormonal Polypeptides and Proteins by N. Back, Plenum Press, New York, 1968, p. 35 et seq.

EXAMPLE 8

A suspension is prepared from the following constituents:

| | | |
|---|---|---|
| $\beta$-corticotropin-Val$^{13}$-amide | mg | 1.0 |
| Calgon® 322 | mg | 2.0 |
| NaCl | mg | 9.0 |
| Dist. water ad | ml | 1 |

EXAMPLE 9

A dry vial is prepared from the following constituents:

| | Mg. |
|---|---|
| $N^\alpha$-acetyl-$\beta^{1-13}$-corticotropin-Val$^{13}$-amide | 0.5 |
| $ZnSO_4 \cdot 7H_2O$ | 1.23 |
| $Na_3PO_4 \cdot 12H_2O$ | 1.38 |
| Mannitol | 40.0 |

The contents are mixed before use with 1 ml. distilled water.

EXAMPLE 10

A suspension is prepared from the following constituents:

| | | |
|---|---|---|
| $N^\alpha$-acetyl-D-Ser$^1$-$\beta^{1-13}$-corticotropin-Val$^{13}$-amide | mg | 0.1 |
| $AlCl_3 \cdot 6H_2O$ | mg | 6.35 |
| 1,5-n. $H_3PO_4$ | ml | 0.052 |
| 1-n. NaOH ad pH 7.1 | | |
| Dist. water ad | ml | 1.0 |

EXAMPLE 11

An injection solution containing the following constituents is prepared:

| | | |
|---|---|---|
| $N^\alpha$-acetyl-D-Ser$^1$-$\beta^{1-13}$-corticotropin-Val$^{13}$-amide | mg | 0.5 |
| Glacial acetic acid | mg | 1.22 |
| Sodium acetate | mg | 0.607 |
| Sodium chloride | mg | 8.1 |
| Dist. water ad | ml | 1 |

EXAMPLE 12

A dry ampoule is prepared from:

| | Mg. |
|---|---|
| D-Ser$^1$-$\beta^{1-13}$-corticotropin-Val$^{13}$-amide | 0.1 |
| Mannitol | 5 |

EXAMPLE 13

An injection solution containing the following constituents is prepared:

| | | |
|---|---|---|
| $N^\alpha$-acetyl-$\beta^{1-13}$-corticotropin-Val$^{13}$-amide | mg | 0.25 |
| Sodium acetate | mg | 1.21 |
| 0.2-n. acetic acid ad pH 3.6 | | |
| NaCl | mg | 2.5 |
| Dist. water ad | ml | 1 |

EXAMPLE 14

An oily injection solution is prepared from:

| | | |
|---|---|---|
| D-Ser$^1$-$\beta^{1-13}$-corticotropin-Val$^{13}$-amide (in the form of the stearate) | mg | 0.1 |
| Benzyl alcohol | mg | 90.0 |
| Sesame oil | ml | 1.0 |

EXAMPLE 15

A nasal powder is prepared containing per dosage unit:

| | Mg. |
|---|---|
| D-Ser$^1$-$\beta^{1-13}$-corticotropin-Val$^{13}$-amide | 1 |
| Lactose | 50 |

EXAMPLE 16

Nasal drops of the following composition are prepared (per drop):

| | | |
|---|---|---|
| $B^{1-16}$-corticotropin | mg | 0.30 |
| Boric acid 99.8% | mg | 0.08 |
| Phosphoric acid 85% | mg | 0.14 |
| Acetic acid 96% | mg | 0.08 |
| NaOH | mg | 0.13 |
| Benzyl alcohol | mg | 0.60 |
| Dist. water ad | ml | 0.04 |

EXAMPLE 17

A nasal gel is prepared containing the following substances in a single dose container:

|  | Mg. |
|---|---|
| $N^\alpha$ - acetyl - D - Ser$^1$-$\beta^{1-13}$ - corticotropin - Val$^{13}$-amide | 0.3 |
| Benzyl alcohol | 3.0 |
| Ceroxin® | 10.5 |
| Miglyol® ad | 300.0 |

EXAMPLE 18

A nasal spray is prepared having the following composition per single dose:

|  | Mg. |
|---|---|
| $N^\alpha$ - acetyl - D - Ser$^1$ - $\beta^{1-13}$ - corticotropin - Val$^{13}$-amide | 1.0 |
| Benzyl alcohol | 0.75 |
| Miglyol® 812 | 13.25 |
| Freon® 12/114 | 60.0 |

EXAMPLE 19

A preparation of the following composition is prepared (for animal tests):

| | |
|---|---|
| $N^\alpha$ - acetyl - D - Ser$^1$ - $\beta^{1-13}$ - corticotropin - Val$^{13}$-amide | mg 1 |
| Polyoxygelatine with 0.5% phenol | ml 1 |

EXAMPLE 20

A solution of the following composition is prepared:

| | |
|---|---|
| $N^\alpha$-acetyl-$\beta^{1-13}$-corticotropin-Val$^{13}$-amide | mg 0.5 |
| Poly-D-glutamic acid (MG 45 000) | mg 200.0 |
| 1-n. NaOH ad pH 7.2 | |
| Merthiolate | mg 0.02 |
| Dist. water ad | ml 1.0 |

EXAMPLE 21

A solution of the following composition is prepared:

| | |
|---|---|
| $\beta$-corticotropin-Val$^{13}$-amide | mg 1.0 |
| Poly-L-glutamic acid (MG 72 000) | mg 200.0 |
| Merthiolate | mg 0.02 |
| Dist. water ad | ml 1 |

EXAMPLE 22

A solution of the following composition is prepared:

| | |
|---|---|
| $N^\alpha$ - acetyl - D - Ser$^1$-$\beta^{1-13}$ - corticotropin - Val$^{13}$-amide | mg 0.25 |
| Poly-L-glutamic acid (MG 39 600) | mg 0.50 |
| Benzyl alcohol | mg 10.0 |
| Acetic acid ad pH 4.0 | |
| Dist. water ad | ml 1 |

Example 23

A lyophilisate of the following composition is prepared:

|  | Mg. |
|---|---|
| $N^\alpha$-acetyl-$\beta^{1-13}$-corticotropin-Val$^{13}$-amide | 0.2 |
| Polyphloretin phosphate | 20.0 |

The $N^\alpha$-acetyl - D - Ser$^1$-$\beta^{1-13}$-corticotropin-Val$^{13}$-amide used as starting material in some of the foregoing examples can be prepared as follows:

(a) $N^\alpha$-acetyl-D-Ser$^1$-$\beta^{1-10}$-corticotropin - $\gamma$ - tert.-butyl ester.—The BOC group is split off from BOC-D-Ser-Tyr-Ser-Met-hydrazide using 90% trifluoroacetic acid. The resulting trifluoroacetic acid salt of the tetrapeptide hydrazide is converted into the acetate using a weakly basic ion exchanger (acetate form) and acetylated with acetic acid-p-nitrophenyl ester in pyridine with the addition of triethylamine. The resulting $N^\alpha$-acetyl-D-Ser-Tyr-Ser-Met-hydrazide is converted into the azide with tert.-butyl nitrite and this is condensed with H-Glu-(OtBu)-His-Phe-Arg-Trp-Gly-OH. The decapeptide derivative is precipitated with water and recrystallized twice from acetonitrile/water. Melting point: 208° C.; $[\alpha]_D^{20}=0°$ (c.=1.1 in dimethyl sulphoxide).

(b) $N^\alpha$-acetyl-D-Ser$^1$-$\beta^{1-13}$-corticotropin-Val$^{13}$-amide.—1 mmol of the decapeptide derivative obtained in (a) is condensed with 1.7 mmol of H-Lys(BOC)-Pro-Val-NH$_2$, HCl using dicyclohexyl carbodiimide (4 mmol, 8 hrs. at 50° C.) The tridecapeptide derivative $N^\alpha$-acetyl-D-Ser-Tyr-Ser-Met-Glu(OtBu) - His - Phe - Arg - Try - Gly-Lys(BOC)-Pro-Val-NH$_2$ is precipitated by pouring the condensation mixture into benzene and purified by recrystallization from dimethyl formamide/benzene and subsequent chromatography on silica gel. The product is eluted with chloroform/methanol (1:1). In thin layer chromatogram on silica gel in chloroform/methanol (1:1) Rf=0.70. To remove the protective groups of the side chain the product is dissolved at 0° C. in trifluoroacetic acid, the solution allowed to warm to room temperature and then left to stand for 1 hour at this temperature. The solution is then poured into ice cold ether, the trifluoroacetic acid salt filtered with suction, dried, dissolved in 5% acetic acid and the solution allowed to pass over a weakly basic ion exchanger (Merck No. II, acetate form). The filtrate is lyophilised to yield the acetate of $N^\alpha$-acetyl-D-Ser$^1$-$\beta^{1-13}$-corticotropin-Val$^{13}$-amide. In thin layer chromatogram on silica gel it has the following Rf values:

Rf=0.42 in n-butanol/pyridine/glacial acetic acid/water 38:24:30)

Rf=0.11 in n-butanol/glacial acetic acid/water (75:7.5:21).

What is claimed is:

1. Pharmaceutical preparations which contain as active constituent an $N^\alpha$-acetyl derivative of a peptide of the Formula I $$X_1\text{-L-}X_2\text{-}X_3\text{-L-}X_4\text{-L-}X_5\text{-L-His-L-Phe-L-Arg-L-Trp-Gly-Y} \quad (I)$$

wherein $X_1$ represents serine (L, LD or D), $X_2$ represents tyrosine or phenylalanine, $X_3$ represents glycine, L-serine or L-alanine, $X_4$ represents methonine or $\alpha$-lower alkyl-$\alpha$-aminoacetic acid, in which lower alkyl has 2–4 carbon atoms, $X_5$ represents glutamyl or glutaminyl and Y represents one or more of the amino acids 11–17 of $\beta$-corticotropin, in which one or more of the amino acids in the 11 and 15–17 positions may be substituted by L-ornithine or the amino-acid in 17-position by L-lysine, or contain C-terminal amides of these peptides or its acid addition salts or complexes in an amount from 0.1 to 2 mg. per inividual dose in admixture with a pharmaceutical carrier selected from the group consisting of lyophilisates, powders, solutions, suspensions, gels and sprays.

2. Pharmaceutical preparations as claimed in claim 1, which contain as active constituent $N^\alpha$-acetyl-D-Ser$^1$-$\beta^{1-13}$-corticotropin-Val$^{13}$-amide, or its acid addition salts or complexes thereof.

3. Pharmaceutical preparations as claimed in claim 1, which contain as active constituent a complex of the $N^\alpha$-acyl derivatives thereof with a phosphate, pyrophosphate, polyphosphate or hydroxide or zinc.

References Cited

UNITED STATES PATENTS 3,632,743  1/1972  Geller et al. _____ 424—45

SHEP K. ROSE, Primary Examiner

U.S. Cl. X.R.

260—112.5; 424—177